INVENTORS
JOHN W. EVELEIGH
LEON CASTELLANI
BY JACK ISREELI

ATTORNEY

INVENTORS
JOHN W. EVELEIGH
LEON CASTELLANI
JACK ISREELI
BY
ATTORNEY

United States Patent Office 3,517,695
Patented June 30, 1970

3,517,695
CONTROLLER FOR A PLURALITY OF HYDRAULIC AND ELECTRICAL CIRCUITS
John W. Eveleigh, Purdy Station, Leon Castellani, Bronx, and Jack Isreeli, Mamaroneck, N.Y., assignors to Technicon Corporation, Ardsley, N.Y., a corporation of New York
Filed Nov. 13, 1967, Ser. No. 682,430
Int. Cl. F16l 55/14
U.S. Cl. 137—566   6 Claims

ABSTRACT OF THE DISCLOSURE

A controller for a plurality of hydraulic and electrical circuits includes a spool having a plurality of releasable shafts. Each shaft has a plurality of cams, some for occluding resiliently compressible tubes against a platen, others for operating switches. Each shaft in succession is indexed into operative position. Each shaft may be inserted and removed with its cams as a complete unit.

BACKGROUND OF THE INVENTION

Field of the invention

This invention relates to process controlling devices, and particularly to a controller for combined hydraulic and electrical circuitry.

Prior art

It is desirable to accurately control the flow of a plurality of fluids in a processing system over an interval of time. For example, in a continuous flow automatic analysis system incorporating the chromatographic separation and subsequent detection of mixtures of amino acids and nucleotides, a plurality of different eluting liquids are sequentially pumped through one or two chromatographic columns by one or two pumps, each coupled to a respective column. The effluents, if two columns are used, may be transmitted alternatively to a common amino acid detection manifold, including a heating bath, a colorimeter and a recorder. To accomplish these functions it is necessary to be able to halt the flow of fluid through selected conduits for selected intervals of time, and to actuate or deactuate pumps in conjunction therewith. Some previous proposals have included electromechanical devices to control the fluid flow, but in operation such devices have tended to require continuous skilled maintenance and accurate preadjustment.

It is an object of this invention to provide an improved valve, which concurrently provides hydraulic and electrical switching functions; and wherein the selected functions may be readily and conveniently changed in sequence and duration prior to the operation of the valve.

SUMMARY OF THE INVENTION

A control apparatus for a plurality of hydraulic and electrical conductors comprises a spool rotatable about its longitudinal axis and having a plurality of means disposed around its periphery to laterally-radially releasably receive a respective plurality of shafts. The spool is disposed adjacent a platen on which are disposed a plurality of resiliently compressible tubes, and also adjacent a plurality of actuator arms for a respective plurality of switches. Each of said plurality of shafts has a plurality of cams releasably mounted thereon, some adapted to cooperate with respective ones of said tubes by either closing or not closing such tubes, and some adapted to cooperate with respective ones of said arms by either deflecting or not deflecting such arms. The spool may be rotated to sequentially bring each shaft with the cams into operative position. Each shaft with its cams undisturbedly mounted thereon may be inserted or removed from the spool, and may be similarly stored without disarrangement of the cams.

BRIEF DESCRIPTION OF THE DRAWING

These and other objects, features and advantages of the invention will be apparent from the following specification thereof, taken in conjunction with the accompanying drawing in which.

DESCRIPTION OF THE PREFERRED EMBODIMENT

Figure 1:
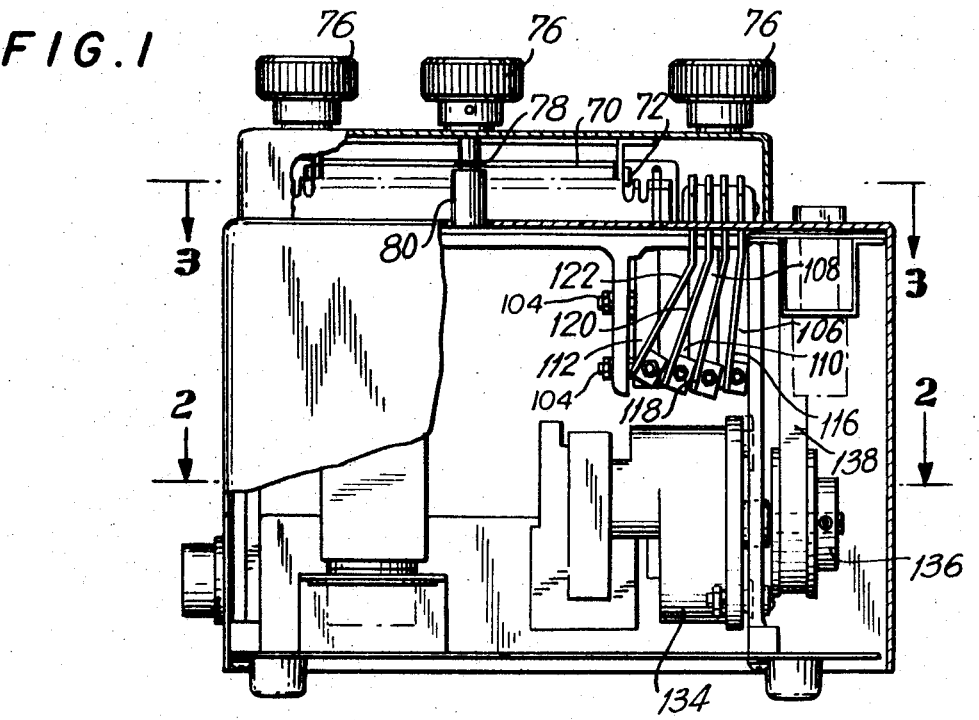
FIG. 1 is a left side elevational view, partially broken away, of an embodiment of the invention.
Figure 2:
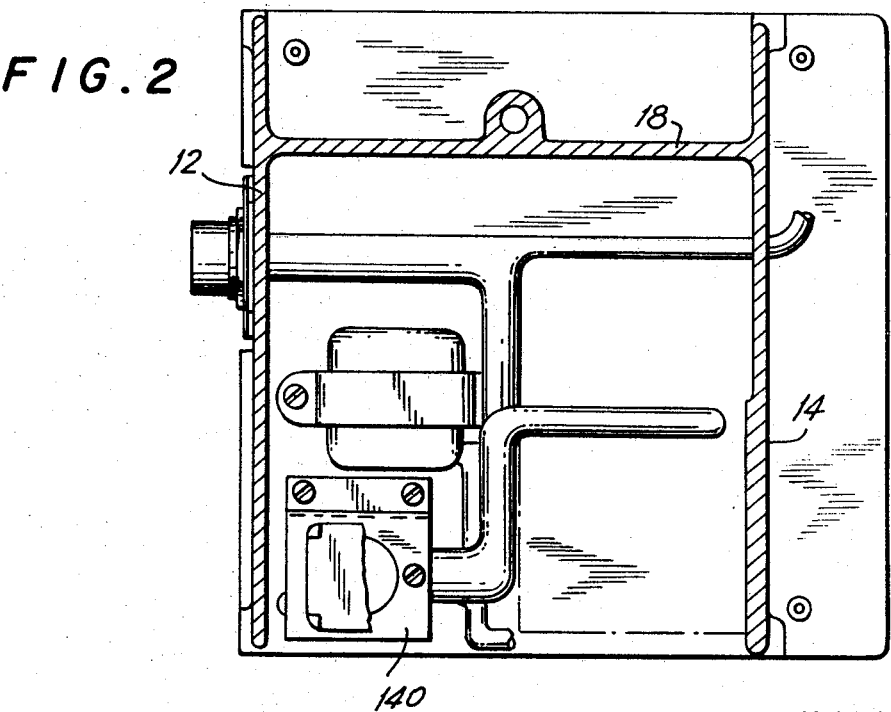
FIG. 2 is a top plan view in a cross-section taken along the plane suggested by line 2—2 of FIG. 1.

As shown in FIGS. 1–6, the controller of this invention is supported by a main casting 10 having a rear wall 12, a front wall 14, a bottom wall 16, which curves upwardly to the left as 16L and which bends upwardly to the right as 16R. Upwardly directed portion 16L merges with a left top web 18, and upwardly directed portion 16R merges with a right top web 20.

Figure 4:
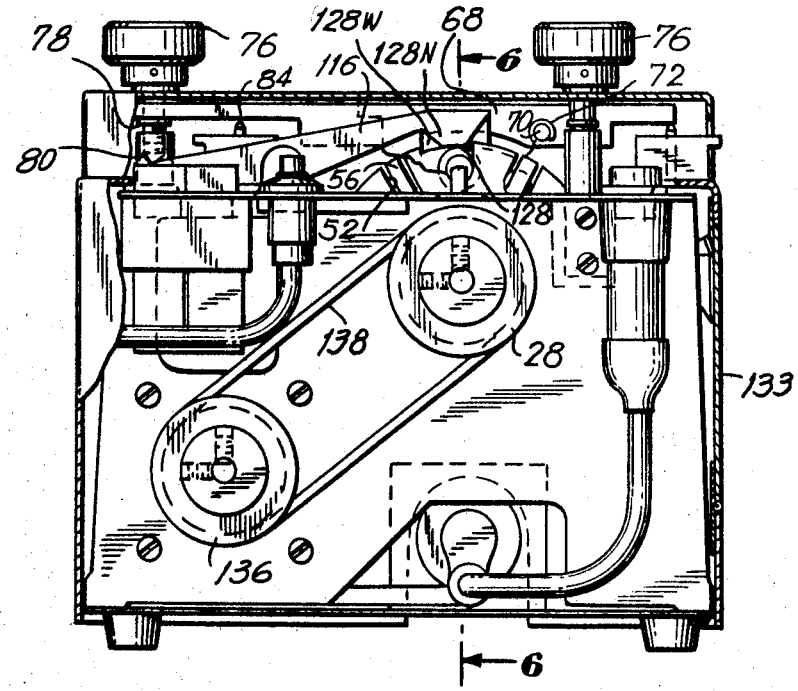
FIG. 4 is a front elevational view in a cross-section taken along the plane suggested by line 4—4 of FIG. 3.

As shown in FIG. 4 a shaft 22 is journalled through and between the rear and front walls by a rear bearing 24 and a front bearing 26. A pulley 28 is fixed to the front end of the shaft by a set screw 30, and spaced from the adjacent bearing by a washer 32. The rear end of the shaft is held in the rear bearing by a retaining ring 34. Three hubs 36, 38 and 40 are pinned to the shaft. Three end plates 42, 44 and 46 are mounted on the shaft to the three hubs respectively by machine screws. A spring clip or spider 48 is mounted to the rear end plate 42, and a front spring clip 50 is mounted to the front end plate 46. Each of the end plates has a plurality of radial cut-outs 52, in FIG. 5 as twelve in number, to respectively receive a like plurality of cam shafts 54. Each of the spring clips has a like plurality of radially directed fingers 56, each terminating in a reflexed bend 58, which projects into a respective cut-out 52 to retain the end of a respective shaft 54 therein. The radial cut-outs on the three end plates are aligned so that each cam shaft 54 is disposed in a respective cut-out in each of the end plates.

The main casting is enclosed by a bottom cover plate 60, a main cover 62, and a platen cover 64. The spaced-apart brackets 66 are fixed to the underside of the cover, and a platen 68 is secured therebetween by a retaining shaft 70 passing through aligned bores in the platen and the brackets, and held by two retaining rings 72 shown in FIG. 4. A plurality of compression springs 74 are disposed in blind bores in the platen to bias the laten downwardly, away from the cover. The cover and the platen are releasably mounted to the main casting by three platen knob screws 76, which pass through aligned bores in the cover and the platen, and are captured thereto by retaining rings 78, and are threaded into bosses 80 projecting up from the main casting. The intermediate undersurface of the platen is concave, spaced from, and substantially concentric with the longitudinal axis of the assembly of cam shafts or spool.

Figure 3:
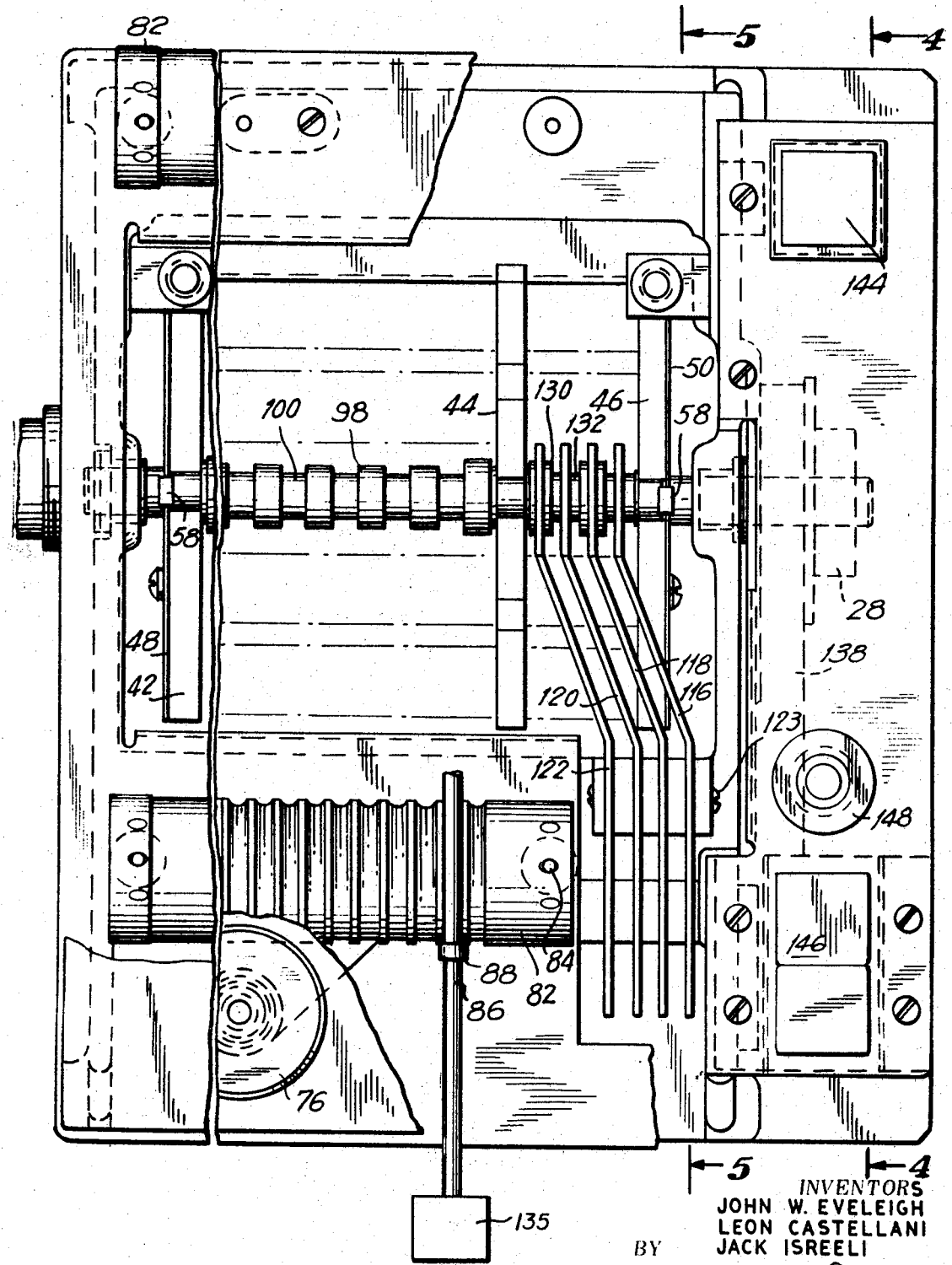
FIG. 3 is a top plan view, on enlarged scale, in a cross-section taken along the plane suggested by line 3—3 of FIG. 1.

Two spaced apart grooved blocks 82 are mounted to the top of the main cover, one over portion 18, the other over portion 20, by means of bores therein receiving respective pins 84 upstanding from the cover, as shown in FIG. 3. A plurality of resiliently compressible tubes 86 are inserted in the grooves and stretched between the blocks 82 by means of collars 88 adhered to the tubes. These tubes pass between the platen and the assembly of cam shafts.

Figure 6:
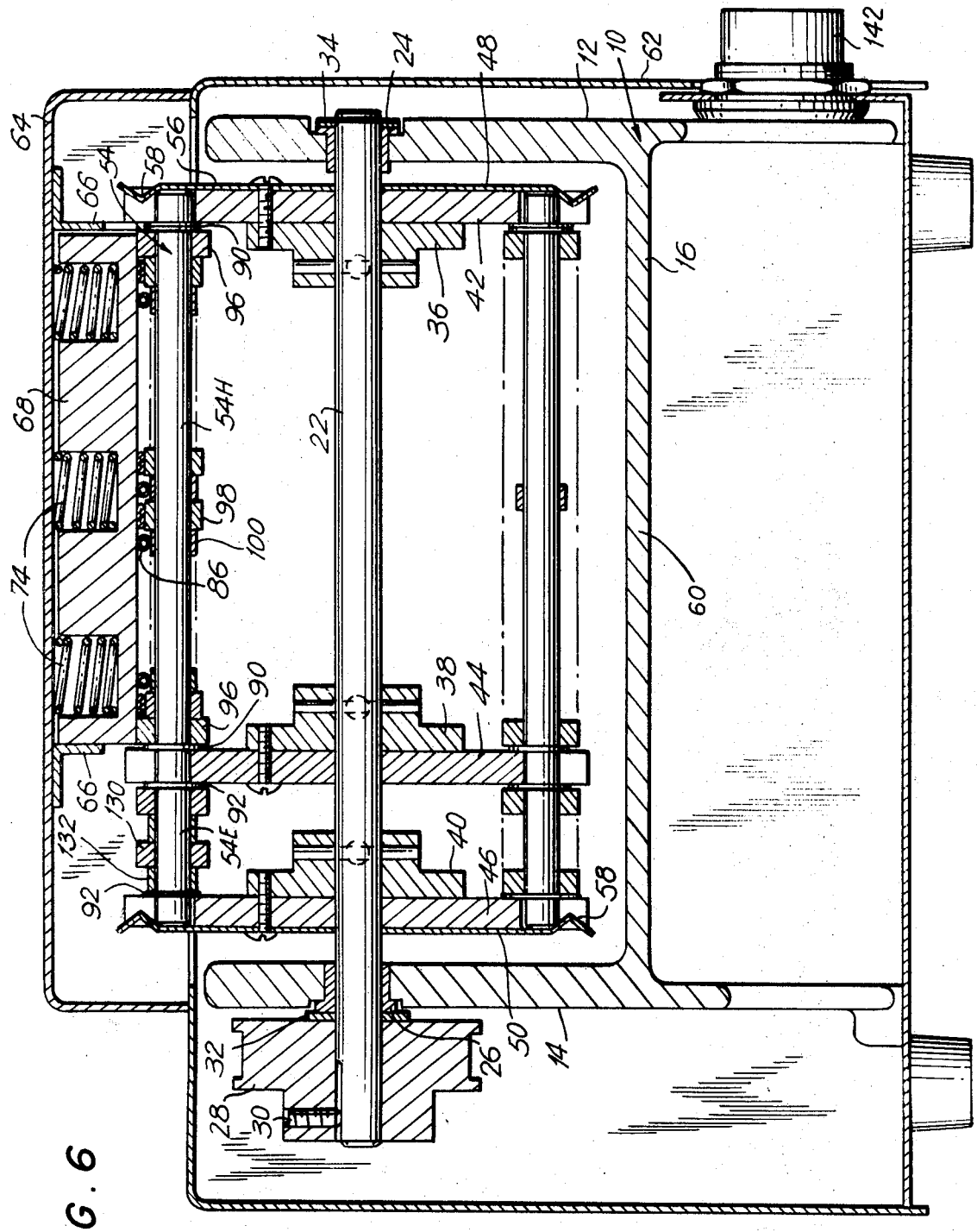
FIG. 6 is a right side elevational view in a cross-section taken along the plane suggested by line 6—6 of FIG. 4.

Each cam shaft 54 is divided into two portions, as shown in FIGS. 3 and 6. Portion 54H is demarked by two spaced apart retaining rings 90, which fit between the end plates 42 and 44. Portion 54E is demarked by two spaced apart retaining rings 92, which fit between the end plates 44 and 46. A plurality of cams or rollers are mounted on the shafts. Two cams 96 of maximum diameter are disposed adjacent the rings 90 and serve to limit the movement of the platen 68 towards the cam shaft 54 under the bias of the springs 74. A variety of large diameter cams 98 and small diameter spacers 100 are disposed between the cams 96. The cams 98 are of a diameter large enough to occlude a tube 86 disposed thereabove against the platen 68 without overcompressing it; the difference in radii between a roller 96 and a roller 98 being equal to, or slightly less than, twice the wall thickness of the tube 86. The spacers 100 are of a diameter small enoughe to clear a tube 86 disposed thereabove. Thus, the cam shaft adjacent the platen 68 will determine which tubes therebetween are occluded and which are open. The normal rest position is with one cam shaft centered on the concave surface of the platen. The concave surface subtends an angle large enough so that, on indexing of the assembly, before the cams 98 of one shaft release any tubes, the cams 98 of the next successive shaft will compress these tubes, maintaining them closed without interruption. The direction of indexing of the assembly is opposed to the direction of normal flow in the tubes so that no increment of fluid is advanced in such tubes on indexing.

Figure 5:
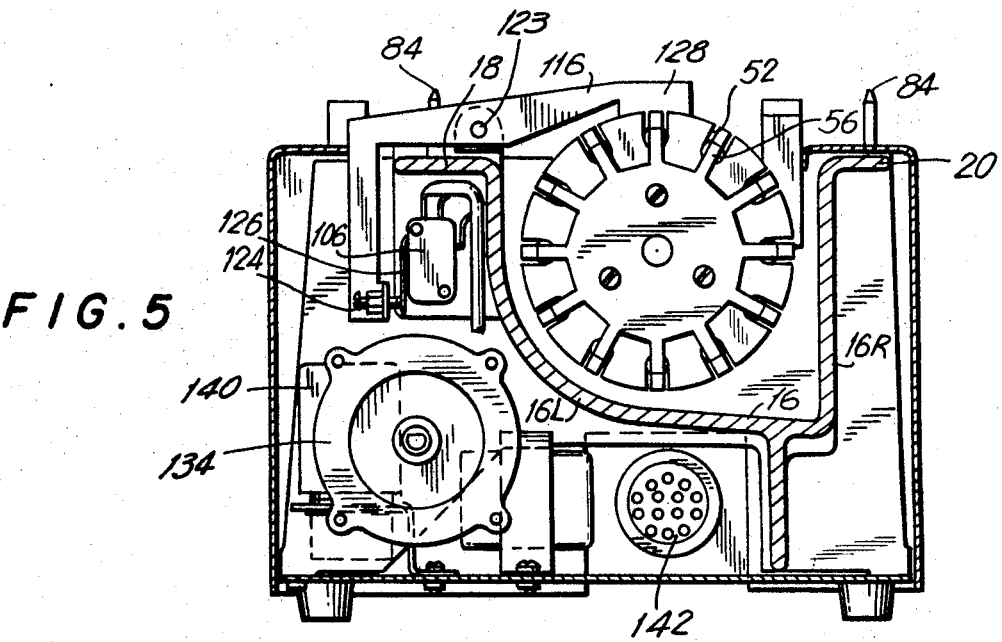
FIG. 5 is a front elevational view in a cross-section taken along the plane suggested by line 5—5 of FIG. 3.

A plurality, shown in FIG. 1 as four, of snap action switches 106, 108, 110, 112 is mounted in a stack to the main casting by two bolts and nuts 104. Four switch-actuator arms 116, 118, 120, 122 are pivotally mounted between two ears extending upwardly from the main casting by a hinge bolt 123. The tail portion of each arm is bent and carries a respective, adjustably mounted machine screw 124, as shown in FIG. 5 which bears against the actuator 126 of the respective switch. The head portion of each arm has a concave portion 128 overlying the assembly of cam shafts. A variety of large diameter cams 130 and small diameter spacers 132 are disposed between the rings 92 on each shaft, as shown in FIG. 6. The cams 130 are of a diameter large enough to engage the concave portion 128 of the arms, e.g. 116, and to rock such an arm to shift the actuator of the respective switch. The spacers 132 are of a diameter small enough to clear the arms. The concave portions are of two types, one 128W subtending an angle large enough to be concurrently engaged by two successive large diametered cams during the indexing of the assembly of cam shafts and the other 128N subtending an angle narrow enough to permit the arm to be restored to its normal position during the indexing.

Thus, it will be seen that the synchronization of closing or opening of selected tubes with the actuation of selected switches is ensured by the disposition of the actuating means, or cams, therefor being mounted on a common shaft. These shafts, with the cams mounted thereon and held in place by the appropriate spaces and retaining rings may be readily snapped into or out of the cut-outs of the end plates. Access for this operation is provided by a door 133 in the cover. Selected ones of these switches may be in circuit with the pump 135 used to advance fluids through the system. When a tube 86 is occluded by a cam, the pump 135 advancing liquid therethrough should be deenergized.

The assembly of cam shafts may be indexed by any suitable means, shown in FIGS. 4 and 5 as a motor and reduction gear assembly 134 driving a pulley 136 which drives the pulley 28 by a timing belt 138. The motor is energized through a latching relay 140. To execute an indexing operation, the relay is initially energized by a pulse from an external switch, not shown, which energizes the relay. The relay has a latching circuit in series with one of the snap-action switches having an actuator arm with narrow surface 128N and normally closed contacts. While the relay is latched, the motor is energized to drive the pulleys to index the next successive cam shaft to the on-center position or tube engaging position. When the shaft reaches the on-center position, a cam has shifted the actuator arm to snap the switch contacts open, to unlatch the relay and deenergize the motor. A fine control of the phasing of this and the other switches may be achieved by adjustment of the screws 124. The remote switch may be incorporated into a clock mechanism, not shown, such as a continuously advancing punched tape.

Electrical system connections may be made through a multiple contact connector 142. The overall power control function is provided by a switch 144. Selection between automatic and manual function is provided by a gang switch 146. When in the automatic function, indexing is initiated as previously described. When in the manual function, indexing is initiated by a push switch 148.

While the preferred embodiment of the invention has been shown and described, it will be understood that the invention may be embodied otherwise than as herein specifically illustrated or described, and that certain changes in the form and arrangement of parts and in the specific manner of practicing the invention may be made without departing from the underlying idea or principles of this invention.

What is claimed is:
1. A multicircuit hydraulic and electrical controller comprising:
   a plurality of cam shafts;
   support means releasably mounting said shafts in a cylindrical array for rotation about a longitudinal axis;
   a plated disposed adjacent to and spaced from said array of shafts;
   a plurality of resiliently compressible tubes disposed in side by side relation between said platen and said array;
   at least one cam disposed on each of said cam shafts, respectively, each such cam adapted to occlude one respective compressible tube against said platen when such shaft is rotated to a position adjacent said platen;
   motive means coupled to said support means for rotating said array of cam shafts;
   switch means coupled to said motive means for halting said motive means, and disposed adjacent to and spaced from said array of shafts;
   an additional cam disposed on each of said cam shafts respectively, each such cam adapted to actuate said switch means to halt said motive means, when such shaft is rotated to said position whereat said first mentioned cam occludes said respective compressible tube;
   each of said cam shafts with said cams mounted thereon being mountable and releasable from said support means as a unit.

2. A controller according to claim 1 further including an additional switch means disposed adjacent to and spaced from said array of shafts, and adapted to be actuated by a yet additional cam disposed on said shaft.

3. A controller according to claim 2 further including a pump coupled to at least one of said resiliently compressible tubes for advancing liquid therethrough, said additional switch means being coupled to said pump to deactuate and actuate said pump in synchronism with the occlusion and release of such tube by a said first mentioned cam.

4. A controller according to claim 1 wherein said support means comprises:
a shaft journalled for rotation with respect to said platen;
two spaced apart plates fixed onto said shaft for rotation therewith;
each of said plates having a like plurality of radial cut-outs therein extending from the periphery of the plate towards the center, said cut-outs being regularly, angularly spaced apart;
each said cut-out in one of said plates being longitudinally aligned with a respective cut-out in the other of said plates, whereby a respective cam shaft may be slid in a radial direction through an aligned pair of cut-outs; and
means for releasably retaining a cam shaft within a respective aligned pair of cut-outs.

5. A controller according to claim 4 wherein said means for releasably retaining a cam shaft comprises:
a spring clip disposed adjacent each cut-out for being deflected by and overlying a cam shaft inserted therein.

6. A controller according to claim 4 wherein said means for releasably retaining a cam shaft comprises:
a spider attached to each plate, and having a finger with a reverse bend therein overlying each cut-out, said bend being deflected by a cam shaft on the insertion thereof into a respective cut-out and overlying said shaft.

References Cited

UNITED STATES PATENTS

| | | |
|---|---|---|
| 2,893,356 | 7/1959 | Murray. |
| 3,245,269 | 4/1966 | Ivie _____ 251—7 XR |

DORSEY NEWTON, Primary Examiner

U.S. Cl. X.R.

137—355.17, 595